US008326235B2

(12) United States Patent
Sato (10) Patent No.: US 8,326,235 B2
(45) Date of Patent: Dec. 4, 2012

(54) COMMUNICATION DEVICE

(75) Inventor: Masaru Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 206 days.

(21) Appl. No.: 12/837,930

(22) Filed: Jul. 16, 2010

(65) Prior Publication Data

US 2011/0076939 A1    Mar. 31, 2011

(30) Foreign Application Priority Data

Sep. 28, 2009    (JP) .................. 2009-223293

(51) Int. Cl.
*H04B 1/44*    (2006.01)

(52) U.S. Cl. .............. 455/78; 455/82; 455/83; 327/308; 327/404; 333/103

(58) Field of Classification Search ..................... 455/39, 455/78, 82, 83; 327/308, 404; 333/81 R, 333/103
See application file for complete search history.

(56) References Cited

U.S. PATENT DOCUMENTS

| 6,118,985 A * | 9/2000 | Kawakyu et al. ............... 455/78 |
| 7,079,816 B2 * | 7/2006 | Khorram et al. ............... 455/78 |
| 7,453,329 B2 | 11/2008 | Inoue |
| 2008/0032653 A1 | 2/2008 | Inoue |

FOREIGN PATENT DOCUMENTS

| JP | 11-46101 A1 | 2/1999 |
| JP | 2004-363862 A1 | 12/2004 |
| WO | WO 2006/100726 A1 | 9/2006 |

* cited by examiner

*Primary Examiner* — Tuan H Nguyen (74) *Attorney, Agent, or Firm* — Kratz, Quintos & Hanson, LLP

(57) ABSTRACT

There is provided a communication device including: a first node connected to an antenna; a transmission unit outputting a signal to the antenna via the first node; a reception unit having a signal input thereto from the antenna via the first node; a first switch provided between the first node and the transmission unit; and a second switch provided between the first node and the reception unit, and in which the second switch is alternately turned on and off repeatedly, and the reception unit includes an amplifier amplifying a signal that the transmission unit outputs via the first and second switches and a mixer mixing a signal amplified in the amplifier and a local signal.

5 Claims, 7 Drawing Sheets

COMMUNICATION DEVICE

CROSS-REFERENCE TO RELATED APPLICATIONS

This application is based upon and claims the benefit of priority of the prior Japanese Patent Application No. 2009-223293, filed on Sep. 28, 2009, the entire contents of which are incorporated herein by reference.

FIELD

The present embodiments relate to a communication device.

BACKGROUND

In recent years, a demand for systems using a high frequency such as a millimeter wave radar and a broadband wireless LAN has increased. In order to provide these systems inexpensively, besides a reduction in price of a semiconductor itself, it is essential to reduce a cost necessary for inspection. The above inspection is to measure whether an IC satisfies its specification by actually inputting a high frequency signal, and all products to be shipped or a considerable number of products to be shipped are needed to be evaluated. In the evaluation, a high frequency measuring device and evaluation device are needed. Thus, money and time are necessary and it costs high for the evaluation. A system capable of evaluating products simply has been requested in order to reduce the cost for the above evaluation.

Further, there has been known a portable wireless terminal including: at least two antennas; a transmission/reception circuit to be used for transmitting and receiving signals; a reception circuit to be used only for receiving a signal; a signal strength detection unit detecting received signal strength of each of the above-described respective antennas; an antenna switching unit for connecting one of the above-described respective antennas to the above-described transmission/reception circuit and connecting the other of the antennas to the above-described reception circuit; and a control unit, based on received signal strength detected in the above-described signal strength detection unit, determining the antenna with the highest received signal strength of the above-described respective antennas and controlling the above-described antenna switching unit to connect the above-described antenna with the highest received signal strength to the above-described transmission/reception circuit.

Further, there has been known a variable attenuator being a variable attenuator attenuating a signal input to an input terminal to output the attenuated signal from an output terminal, the variable attenuator including: a plurality of transmission lines connected in series between the input terminal and the output terminal; a first resistance element connected in parallel to the transmission line connected to the input terminal; and a second resistance element connected in parallel to the transmission line connected to the output terminal.

Further, there has been known a high frequency switch device including first to third terminals, a first FET, a first inductor and a first capacitor connected in parallel to the first FET respectively, a first circuit having one end thereof connected to the first terminal, a second FET, a second inductor and a second capacitor connected in parallel to the second FET respectively, and a second circuit having one end thereof connected to the other end of the first circuit and having the other end thereof connected to the second terminal.

[Patent Document 1] Japanese Laid-open Patent Publication No. 2004-363862
[Patent Document 2] International Publication Pamphlet No. WO 2006/100726
[Patent Document 3] Japanese Laid-open Patent Publication No. 11-46101

SUMMARY

A communication device includes: a first node connected to an antenna; a transmission unit outputting a signal to the antenna via the first node; a reception unit having a signal input thereto from the antenna via the first node; a first switch provided between the first node and the transmission unit; and a second switch provided between the first node and the reception unit, and in which the second switch is alternately turned on and off repeatedly, and the reception unit includes an amplifier amplifying a signal that the transmission unit outputs via the first and second switches and a mixer mixing a signal amplified in the amplifier and a local signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

Figure 1:
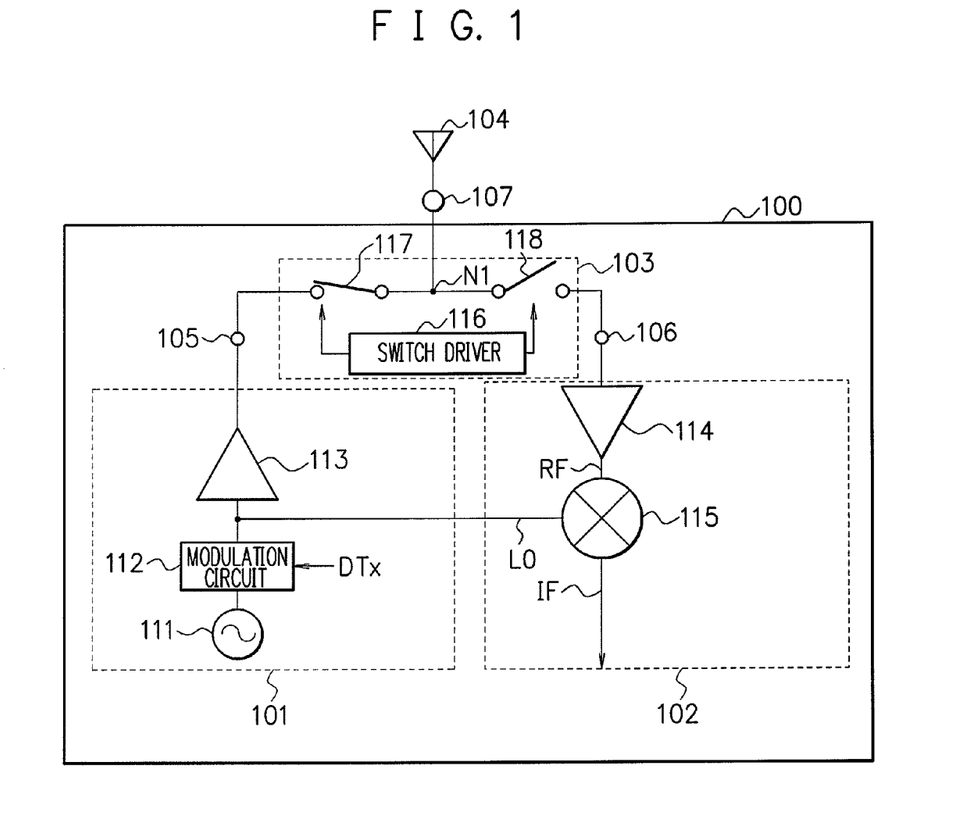
FIG. 1 is a view depicting a configuration example of a communication device according to a first embodiment.

FIG. 1 is a view depicting a configuration example of a communication device according to a first embodiment. The communication device has an integrated circuit (IC) 100 and an antenna 104. The integrated circuit 100 has a transmission unit 101, a reception unit 102, and a switch unit 103. The transmission unit 101 has an oscillator 111, a modulation circuit 112, and a power amplifier 113. The reception unit 102 has a low-noise amplifier 114 and a frequency mixer (mixer) 115. The switch unit 103 has a first switch 117, a second switch 118, and a switch driver 116.

A first node N1 is connected to the antenna 104 via an antenna terminal 107. A transmission unit terminal 105 is connected to an output terminal of the transmission unit 101. A reception unit terminal 106 is connected to an input terminal of the reception unit 102. The first switch 117 is connected between the first node N1 and the transmission unit terminal 105. The second switch 118 is connected between the first node N1 and the reception unit terminal 106. The oscillator 111 oscillates a high frequency (RF) signal at a first frequency f1. The first frequency f1 is, for example, 77 GHz. The modulation circuit 112, based on a transmission signal DTx, modulates an oscillation signal from the oscillator 111 to output a signal LO. The transmission signal DTx is, for example, 10 MHz. The power amplifier 113 amplifies an output signal from the modulation circuit 112 to output an amplified signal to the transmission unit terminal 105. The low-noise amplifier 114 amplifies a signal input from the reception unit terminal 106 to output a signal RF. The frequency mixer 115 mixes the signal RF and the signal LO to output a signal IF.

The communication device has a transmission mode, a reception mode, and an inspection mode. First, the transmission mode is explained. In the transmission mode, by control of the switch driver 116, the first switch 117 is turned on and the second switch 118 is turned off. Concretely, the oscillator 111 oscillates a high frequency signal. The modulation circuit 112 modulates an oscillation signal from the oscillator 111 based on the transmission signal DTx. The power amplifier 113 amplifies an output signal from the modulation circuit 112 to wirelessly transmit an amplified signal via the first switch 117 and the antenna 104. The signal to be transmitted is attenuated by the wireless transmission to thus be amplified in the power amplifier 113. As described above, the transmission unit 101 outputs a signal to the antenna 104 via the first switch 117 and the first node N1.

Next, the reception mode is explained. In the reception mode, by control of the switch driver 116, the first switch 117 is turned off and the second switch 118 is turned on. The reception unit 102 has a signal input thereto from the antenna 104 via the first node N1 and the second switch 118. The low-noise amplifier 114 has the signal that is wirelessly received via the antenna 104 and the second switch 118 input thereto and amplifies the input signal to output a signal. The modulation circuit 112 outputs an oscillation signal from the oscillator 111 as it is as the signal LO. The frequency mixer 115 mixes the signal RF output from the low-noise amplifier 114 and the signal (local signal) LO output from the modulation circuit 112 to output the intermediate frequency signal IF. For the output signal from the frequency mixer 115, processing such as demodulation is performed in a demodulation circuit.

Next, the inspection mode is explained. In the inspection mode, a signal is input to the reception unit 102, and based on a ratio of power of the input signal to the reception unit 102 and power of an output signal from the reception unit 102, an inspection of a gain of the reception unit 102 is performed. In the inspection mode, by control of the switch driver 116, the first switch 117 is turned off (fixed), and the second switch 118 is alternately turned on and off repeatedly by a second frequency f2. The oscillator 111 oscillates a high frequency signal at the first frequency f1, (which is 77 GHz, for example). In the inspection mode, the modulation circuit 112 does not perform modulation to output an oscillation signal from the oscillator 111 as it is as the signal LO. The power amplifier 113 amplifies the signal LO output from the modulation circuit 112.

The first switch 117 is off. The first node N1 has a leakage signal input thereto from the power amplifier 113 via the first switch 117. Note that in the reception mode, the signal that the antenna 104 receives wirelessly is a weak signal. Thus, the signal that the first node N1 receives from the antenna 104 in the reception mode and the leakage signal that the first node N1 receives from the power amplifier 113 in the inspection mode are signals of substantially the same power, and an inspection on substantially the same condition as that of the reception mode can be performed. When the first switch 117 is turned on tentatively, the signal that the first node N1 receives from the power amplifier 113 in the inspection mode is more increased in power than the signal that the first node N1 receives from the antenna 104 in the reception mode, which is inappropriate. The first switch 117 is in an off state and thereby functions as an attenuator attenuating a signal.

The second switch 118 has a control signal at the second frequency f2, (which is, for example, 1 kHz), input thereto and is turned on and off repeatedly at the second frequency f2. As a result, the second switch 118 has a signal at the first frequency f1 input thereto from the first node N1 to output a signal at a third frequency f3 to the low-noise amplifier 114. The third frequency f3 is a frequency of f1±f2. The low-noise amplifier 114 amplifies the signal input from the second switch 118 to output the signal RF at the third frequency f3.

The frequency mixer 115 mixes the signal RF output from the low-noise amplifier 114 and the signal (local signal) LO output from the modulation circuit 112 to output the intermediate frequency signal IF. Concretely, the frequency mixer 115 outputs the intermediate frequency signal IF at the second frequency f2 being a difference frequency between the signal RF at the third frequency f3 (=f1±f2) and the local signal LO at the first frequency f1. For example, the first frequency f1 is 77 GHz, and the second frequency f2 is 1 kHz. Since the frequency mixer 115 outputs the signal IF at the low frequency f2, the inspection can be performed by an inexpensive device.

As described above, the frequency mixer 115 has the signal RF and the local signal LO that is generated in the transmission unit 101 input thereto to generate the signal IF at the difference frequency therebetween. A power detection unit detects power of the frequency mixer 115. Further, the power detection unit detects power of an input signal to the low-noise amplifier 114 in advance. An inspection device can inspect a gain of the reception unit 102 (low-noise amplifier 114 and frequency mixer 115) by taking a ratio of the power of the signal IF output from the frequency mixer 115 and the power of the input signal to the low-noise amplifier 114.

Even when the first switch 117 is turned off, part of the signal at the first frequency f1 actually passes through the first node N1 as leakage power. Normally, power of −20 dB to −30 dB or so (1/100 to 1/1000) passes through the first node N1. In this embodiment, the above leakage power is used for the inspection of the reception unit 102. By using the power leaked to the first node N1, on/off switching in the second switch 118 is performed. When a frequency of the switching thereof is set as f2 and modulation is performed in the second switch 118, a signal having a frequency component of f1±f2 is input to the reception unit 102. In the reception unit 102, the modulated signal is amplified in the low-noise amplifier 114 to then be input to the frequency mixer 115. Part of the signal LO generated in the transmission unit 101, (of which the frequency is f1), is also input to the frequency mixer 115. The frequency mixer 115 outputs the signal IF at the frequency f2 being a difference component between the two frequencies f1 and f3. By obtaining a ratio of strength of the signal to be input to the reception unit 102 and strength of the signal to be output from the reception unit 102, a gain of the reception unit 102 can be obtained. A gain of the reception unit 102, which has not been able to be evaluated unless a high frequency signal at a frequency different from the first frequency f1 is externally input to the antenna terminal 107 so far, can be obtained by employing a system as above.

By detecting the power of the input signal to the low-noise amplifier 114 and the power of the output signal from the frequency mixer 115, a gain of the reception unit 102 can be evaluated. Since the signal LO from the transmission unit 101 is used, without using an external high frequency signal source, gain performance of the reception unit 102 can be inspected inexpensively and an inspection cost can be reduced.

Note that the local signal LO to be input to the frequency mixer 115 does not have to be an output signal from the modulation circuit 112 as long as it is a signal at the same frequency as the first frequency f1.

Second Embodiment

Figure 2:
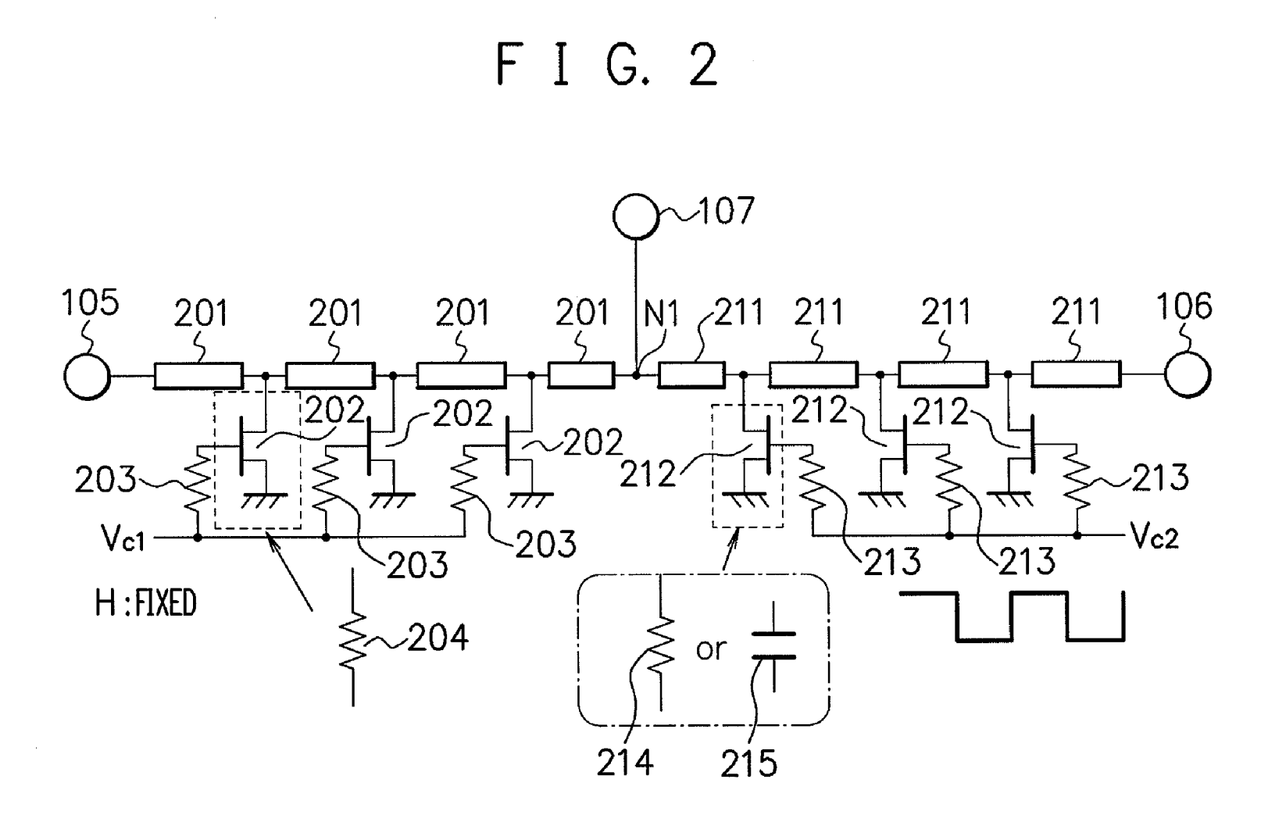
FIG. 2 is a circuit diagram depicting a configuration example of a first switch and a second switch according to a second embodiment.

FIG. 2 is a circuit diagram depicting a configuration example of a first switch 117 and a second switch 118 according to a second embodiment.

The first switch 117 has a plurality of first inductors 201, a plurality of first n-channel field-effect transistors 202, and a plurality of resistances 203. The plural first inductors 201 are connected in series between a first node N1 and a transmission unit terminal 105. Note that the first inductors 201 may also be inductor components of a transmission line. The plural first n-channel field-effect transistors 202 have drains thereof connected to interconnection points of the plural first inductors 201, have sources thereof connected to reference potential (ground potential) nodes, and have a voltage Vc1 higher than a threshold voltage applied to gates thereof via the resistances 203 respectively. The voltage Vc1 is a fixed voltage at a high level, and is supplied by the switch driver 116 in FIG. 1. As a result, the first n-channel field-effect transistors 202 are turned on to function as on-resistances 204 between the interconnection points of the first inductors 201 and the reference potential nodes.

The voltage Vc1 is a voltage higher than a threshold voltage of the transistors 202, which is, for example, 1 V. When the voltage Vc1 is applied, equivalent circuits between the drains and the sources of the transistors 202 are represented as the resistances 204. Thus, the resistances 204 are connected in parallel to the interconnection points of the inductors 201 between the transmission unit terminal 105 and the first node N1. When the resistances 204 are connected in parallel, impedances are reduced and power to be input from the transmission unit terminal 105 is short-circuited to the reference potential nodes substantially. As a result, the first switch 117 is turned off. Leakage power of the first switch 117 is −20 dB to −30 dB or so as described previously.

The second switch 118 has a plurality of second inductors 211, a plurality of second n-channel field-effect transistors 212, and a plurality of resistances 213. The plural second inductors 211 are connected in series between the first node N1 and a reception unit terminal 106. Note that the second inductors 211 may also be inductor components of a transmission line. The plural second n-channel field-effect transistors 212 have drains thereof connected to interconnection points of the plural second inductors 211, have sources thereof connected to reference potential nodes, and have a pulse voltage Vc2 in which a voltage higher than a threshold voltage and a voltage lower than the threshold voltage are repeated alternately applied to gates thereof via the resistances 213 respectively. The voltage Vc2 is a pulse voltage at a high level and a low level at a second frequency f2, and is supplied by the switch driver 116 in FIG. 1. When the voltage Vc2 turns to a high level, the second re-channel field-effect transistors 212 are turned on to function as on-resistances 214 between the interconnection points of the second inductors 211 and the reference potential nodes. Further, when the voltage Vc2 turns to a low level, the second re-channel field-effect transistors 212 are turned off to function as capacitances 215 between the interconnection points of the second inductors 211 and the reference potential nodes.

The voltage Vc2 is a pulse voltage in which a voltage higher than a threshold value of the transistors 212, (which is, for example, 1 V), and a voltage lower than the threshold value of the transistors 212, (which is, for example, −1 V), are repeated alternately. The operation in the case when a voltage higher than the threshold value is applied is described previously in the first switch 117, so that it is omitted. When a voltage lower than the threshold value is applied, the drains-to-sources of the transistors 212 are represented as equivalent circuits of the capacitances 215. A capacitance value of each of the capacitances 215 is selected to be a value to math with an inductance of each of the inductors 211, and thereby a passed state is achieved. For example, when the capacitance value of each of the capacitances 215 is set as C and the inductance of each of the indictors 211 is set as L, L and C are selected so that a characteristic impedance $\sqrt{(L/C)}$ becomes 50Ω. By impedance matching, the second switch 118 is turned on. Since the voltage Vc2 is a pulse voltage at the second frequency f2, the second switch 118 is alternately turned on and off repeatedly at the second frequency f2.

Power to be input from the transmission unit terminal 105 is tentatively set to be −10 dBm (10 mW) and leakage power of the first switch 117 is tentatively set to be −30 dB. Then, when the first switch 117 is turned off as described above, power of the first node N1 becomes −20 dBm or so. Further, when the second switch 118 is turned on, power of the reception unit terminal 106 becomes −20 dBm or so, and when the second switch 118 is turned off, power of the reception unit terminal 106 becomes −50 dBm or so. The second switch 118 is turned on/off, and thereby modulation signals of −20 dBm/−50 dBm are output to the reception unit terminal 106. Note that P [dBm] is expressed as $10^{P\ [mW]/10}$.

Third Embodiment

Figure 3:
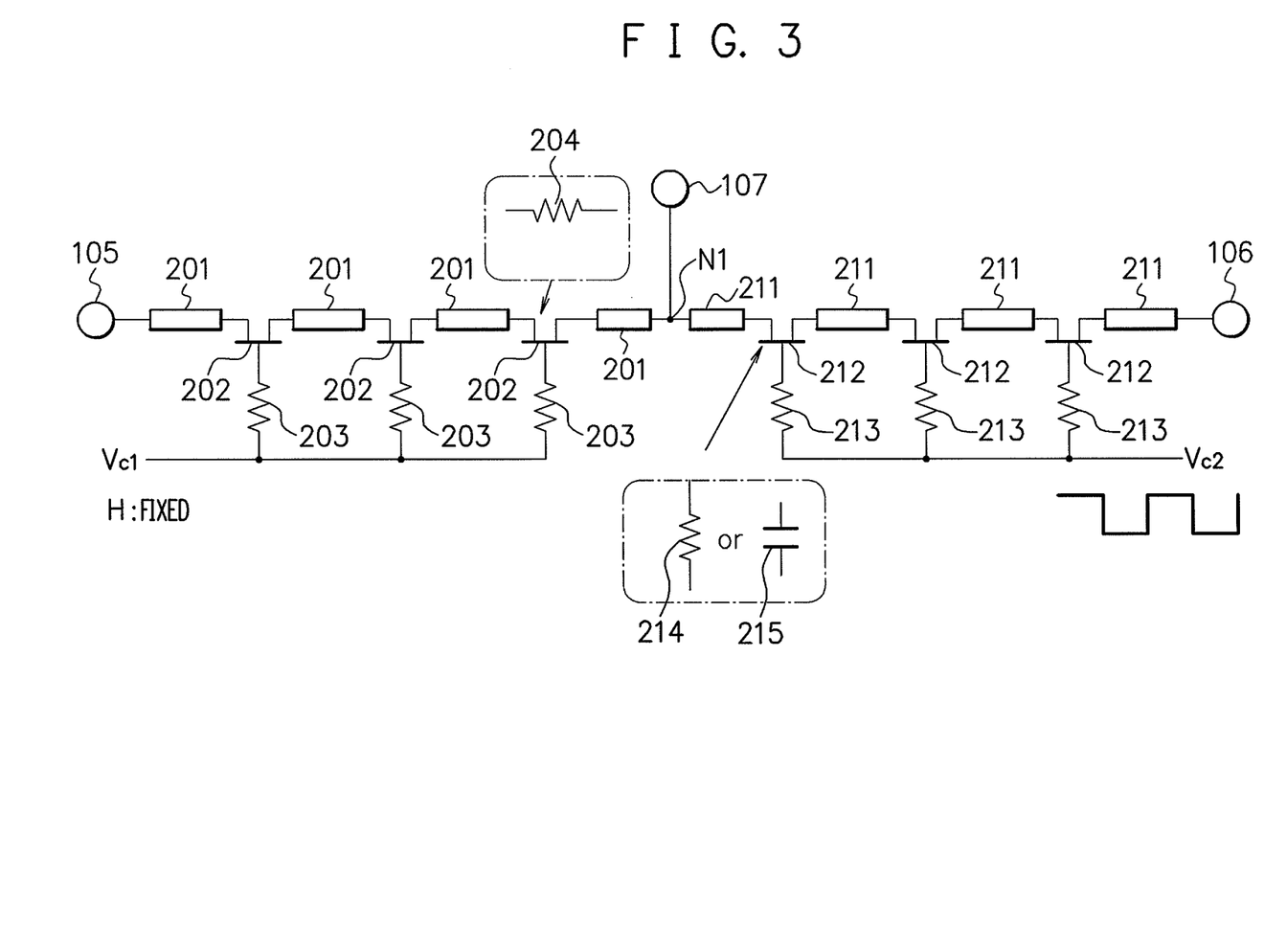
FIG. 3 is a circuit diagram depicting a configuration example of a first switch and a second switch according to a third embodiment.

FIG. 3 is a circuit diagram depicting a configuration example of a first switch 117 and a second switch 118 according to a third embodiment.

The first switch 117 has a plurality of first inductors 201, a plurality of first n-channel field-effect transistors 202, and a plurality of resistances 203. The plural first inductors 201 are connected in series between a first node N1 and a transmission unit terminal 105. The plural first n-channel field-effect transistors 202 have sources and drains thereof connected in series between the plural first inductors 201. A voltage Vc1 higher than a threshold voltage is applied to respective gates of the plural first n-channel field-effect transistors 202 via the resistances 203. The voltage Vc1 is a fixed voltage at a high level, and is supplied by the switch driver 116 in FIG. 1. As a result, the first n-channel field-effect transistors 202 are turned on to function as on-resistances 204 between the sources and the drains.

In the second embodiment, the transistors 202 are connected in parallel. This embodiment is configured in a manner that the transistors 202 are connected in series. The case when the voltage Vc1 is fixed at a voltage higher than a threshold value is explained. As described previously, in the above case, the drains-to-sources of the transistors 202 are represented as the resistances 204 in equivalent circuits. When the resistances 204 are connected in series, impedances are increased, and the first switch 117 turns to an off (open) state.

The second switch 118 has a plurality of second inductors 211, a plurality of second n-channel field-effect transistors 212, and a plurality of resistances 213. The plural second inductors 211 are connected in series between the first node N1 and a reception unit terminal 106. The plural second re-channel field-effect transistors 212 have sources and drains thereof connected in series between the plural second inductors 211. A pulse voltage Vc2 in which a voltage higher than a threshold voltage and a voltage lower than the threshold voltage are repeated alternately is applied to respective gates of the plural second n-channel field-effect transistors 212. The voltage Vc2 is a pulse voltage at a second frequency f2, and is supplied by the switch driver 116 in FIG. 1. When the voltage Vc2 turns to a high level, the second n-channel field-effect transistors 212 are turned on to function as on-resistances 214 between the sources and the drains. Further, when the voltage Vc2 turns to a low level, the second re-channel field-effect transistors 212 are turned off to function as capacitances 215 between the sources and the drains.

The voltage Vc2 is a voltage in which a voltage higher than a threshold value of the transistors 212 and a voltage lower than the threshold value of the transistors 212 are alternately repeated. The operation in the case when a voltage higher than the threshold value is applied to turn the second switch 118 off is similar to that of the above-described first switch 117. The case of the second switch 118 being in an on state is explained. When a voltage lower than the threshold value is applied to the gates of the transistors 212, equivalent circuits of the transistors 212 turn to the capacitances 215. By selecting an appropriate value as a size of each of the transistors 212, each of the capacitances 215 to have a value to cancel an impedance (L) of each of the inductors 211 is achieved, and then a synthesized impedance Z of the inductor 211 and the transistor 212 (capacitance 215) is expressed by the following expression.

$$Z=j\Omega L+1/(j\Omega C)$$

Here, j is a symbol of an imaginary number, w is an angular frequency (=2×π×f), f is a frequency, L is an inductance of the inductor 211, and C is a capacitance value of the equivalent capacitance 215 between the drain and the source of the transistor 212. The inductance L and the capacitance value C (size of the transistor 212) are selected so that the value of the synthesized impedance Z becomes 0, and thereby the impedance Z of the second switch 118 is reduced, (which is 0 ideally), and the second switch 118 turns to an on (continuity) state. That is, L and C are selected to be $f=1/\{2\times\pi\times\sqrt{(L\times C)}\}$.

Since the voltage Vc2 is a pulse voltage at the second frequency f2, the second switch 118 is alternately turned on and off repeatedly at the second frequency f2. By using the second switch 118, modulation signals at the second frequency f2 can be generated and a gain of a reception unit 102 can be simply measured.

Fourth Embodiment

Figure 4:
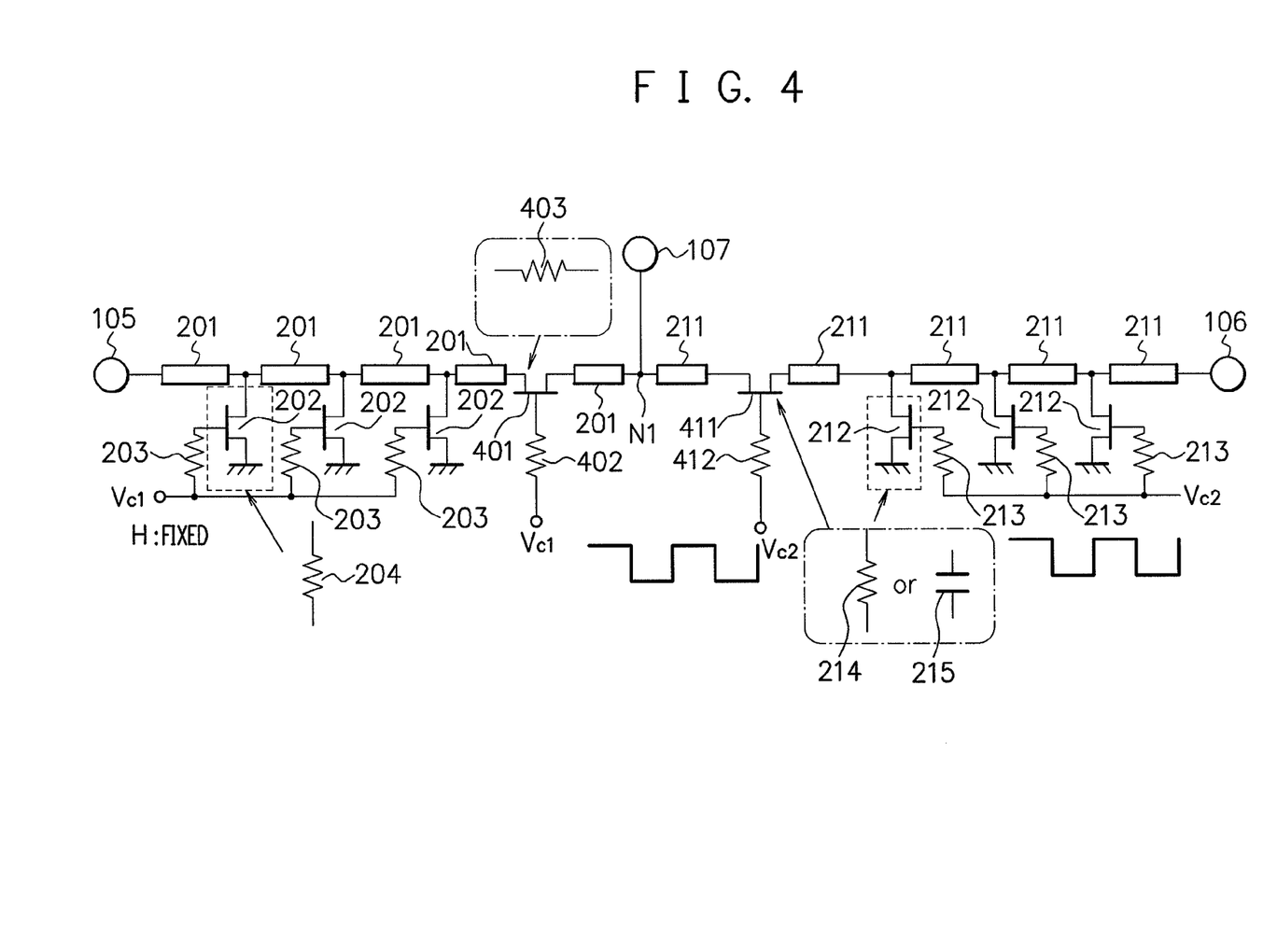
FIG. 4 is a circuit diagram depicting a configuration example of a first switch and a second switch according to a fourth embodiment.

FIG. 4 is a circuit diagram depicting a configuration example of a first switch 117 and a second switch 118 according to a fourth embodiment. This embodiment is the combination of the second embodiment and the third embodiment. This embodiment (FIG. 4) is such that n-channel field-effect transistors 401 and 411 and resistances 402 and 412 are added to the second embodiment (FIG. 2). Hereinafter, points where this embodiment differs from the second embodiment are explained.

The first switch 117 has the third n-channel field-effect transistor 401 and the resistance 402 besides first inductors 201, first n-channel field-effect transistors 202, and resistances 203. The third n-channel field-effect transistor 401 has a source and a drain thereof connected in series between the plural first inductors 201. A voltage Vc1 higher than a threshold voltage is applied to a gate of the third n-channel field-effect transistor 401 via the resistance 402. The third n-channel field-effect transistor 401, similarly to the re-channel field-effect transistors 202 in the third embodiment, is turned on to function as a resistance 403 between the source and the drain. This brings the first switch 117 into an off state.

The second switch 118 has the fourth re-channel field-effect transistor 411 and the resistance 412 besides second inductors 211, second n-channel field-effect transistors 212, and resistances 213. The fourth n-channel field-effect transistor 411 has a source and a drain thereof connected in series between the plural second inductors 211. A pulse voltage Vc2 in which a voltage higher than a threshold voltage and a voltage lower than the threshold voltage are alternately repeated is applied to a gate of the fourth n-channel field-effect transistor 411 via the resistance 412. When the voltage Vc2 is at a high level, the fourth n-channel field-effect transistor 411, similarly to the n-channel field-effect transistors 212 in the third embodiment, is turned on to function as a resistance 214 between the source and the drain. When the voltage Vc2 is at a low level, the fourth re-channel field-effect transistor 411 is turned off to function as a capacitance 215 between the source and the drain. This alternately brings the second switch 118 into an on state and an off state repeatedly at a second frequency f2.

Fifth Embodiment

Figure 5A:
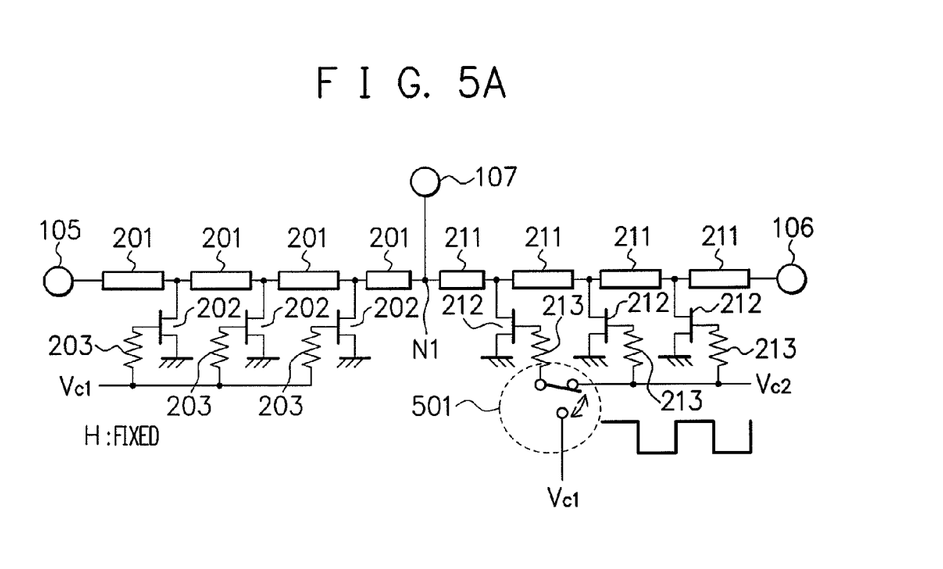
FIG. 5A and FIG. 5B are circuit diagrams depicting configuration examples of a first switch and a second switch according to a fifth embodiment.
Figure 5B:
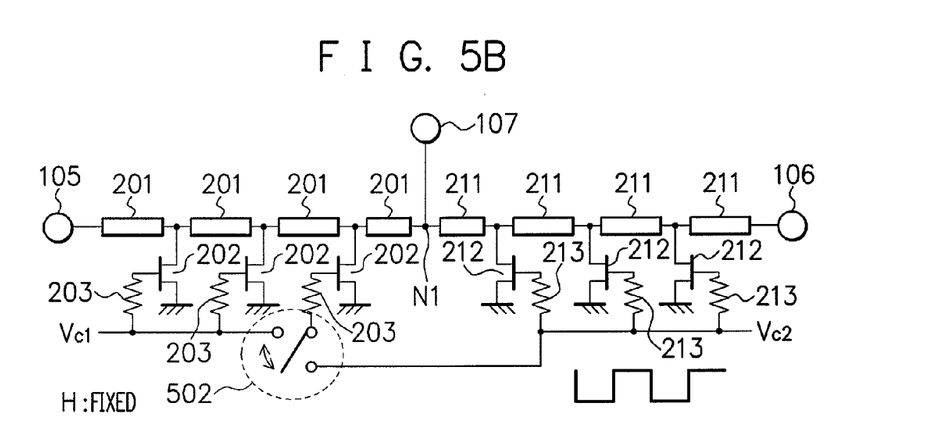

FIG. 5A and FIG. 5B are circuit diagrams depicting configuration examples of a first switch 117 and a second switch 118 according to a fifth embodiment. This embodiment enables a level of a signal to be input to a reception unit 102 to change arbitrarily.

FIG. 5A is such that a switch 501 is added to the second embodiment (FIG. 2). The switch 501 selectively supplies a voltage Vc1 or Vc2 to a gate of one transistor 212 of the plural second n-channel field-effect transistors 212. That is, the voltage Vc1 higher than a threshold voltage or the voltage Vc2 in which a voltage higher than the threshold voltage and a voltage lower than the threshold voltage are alternately repeated is selectively applied to the gate of one of the second n-channel field-effect transistors 212. The operation in the case when the switch 501 supplies the voltage Vc2 to the gate of the transistor 212 is the same as that of the second embodiment. In the case when the switch 501 supplies the voltage Vc1 to the gate of the transistor 212, it is possible that the transistor 212 to which the voltage Vc1 is supplied is turned on, and it functions as a resistance to attenuate a signal.

In the first to fourth embodiments, for example, the case when the modulation signals in which −20 dBm and −50 dBm appear alternately are output to the reception unit 102 is explained. In the case when the level of a signal to be input to the reception unit 102 is large, which is −20 dBm, it can be lowered in this embodiment. It is set in a manner that the voltage Vc1 higher than a threshold value is applied to one of the gates of the second re-channel field-effect transistors 212. In the case when the voltage Vc1 higher than the threshold value is applied, the transistor 212 is regarded as the resistance, and thus the level of a signal to pass is attenuated. Thus, the level of a signal at the time of on, which is −20 dBm in the second embodiment, is attenuated. The number of the transistors 212 to which the fixed voltage Vc1 is applied is increased and decreased by the switch 501, and thereby the level of a signal to be input to the reception unit 102 can be set to be an arbitrary value.

FIG. 5B is such that a switch 502 is added to the second embodiment (FIG. 2). The switch 502 selectively supplies the voltage Vc1 or Vc2 to a gate of one transistor 202 of the plural first n-channel field-effect transistors 202. That is, the voltage Vc1 higher than the threshold voltage or the voltage Vc2 in which a voltage higher than the threshold voltage and a voltage lower than the threshold voltage are alternately repeated is selectively applied to the gate of one of the first n-channel field-effect transistors 202. The operation in the case when the switch 502 supplies the voltage Vc1 to the gate of the transistor 202 is the same as that of the second embodiment. In the case when the switch 502 supplies the voltage Vc2 to the gate of the transistor 202, it is possible that the transistor 202 to which the voltage Vc2 is supplied is turned on and off repeatedly to strengthen a signal.

In the second embodiment, when the level of a signal to be input to the reception unit 102 is not adequate, the number of the transistors 202 to which the voltage Vc2 is supplied is increased, and thereby an amount of power to pass can be increased.

Note that this embodiment can be applied to the third and fourth embodiments besides the second embodiment.

Sixth Embodiment

Figure 6:
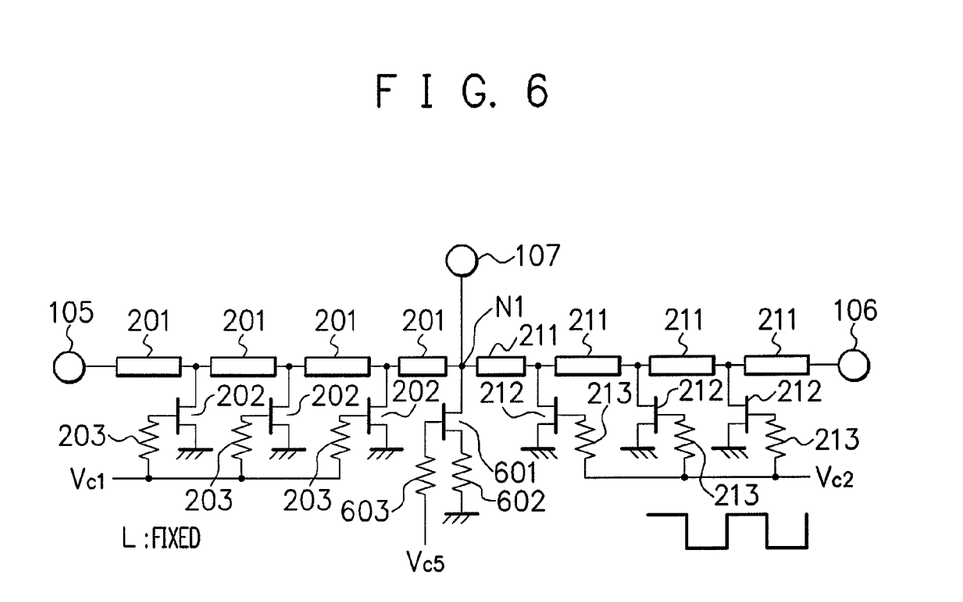
FIG. 6 is a circuit diagram depicting a configuration example of a first switch and a second switch according to a sixth embodiment.

FIG. 6 is a circuit diagram depicting a configuration example of a first switch 117 and a second switch 118 according to a sixth embodiment. This embodiment (FIG. 6) is such that a fifth n-channel field-effect transistor 601 and resistances 602 and 603 are added to the second embodiment (FIG. 2). Hereinafter, points where this embodiment differs from the second embodiment are explained. The fifth n-channel field-effect transistor 601 has a drain and a source thereof connected between a first node N1 and a reference potential node. In the transmission mode and the reception mode, a voltage Vc5 lower than a threshold voltage is applied to a gate of the fifth n-channel field-effect transistor 601 via the resistance 603, and in the inspection mode, the voltage Vc5 higher than the threshold voltage is applied to the gate of the fifth n-channel field-effect transistor 601 via the resistance 603. The resistance 602 is connected between the source of the transistor 601 and the reference potential node.

In the transmission mode and the reception mode, the voltage Vc5 turns to a voltage lower than a threshold value (low level). Then, the transistor 601 is turned off to function as a capacitance. A capacitance value of the above capacitance is set to be small, and thereby the above capacitance does not affect the operation. That is, FIG. 6 becomes equivalent to the circuit in FIG. 2.

In the inspection mode, the voltage Vc5 turns to a voltage higher than the threshold value (high level). Then, the transistor 601 is turned on to function as a resistance. The above resistance can serve as a function of absorbing leakage power of a signal to be input from a transmission unit terminal 105 and can lower the level of a signal to be output to a reception unit terminal 106.

Note that this embodiment can be applied to the third to fifth embodiments besides the second embodiment.

Seventh Embodiment

Figure 7:
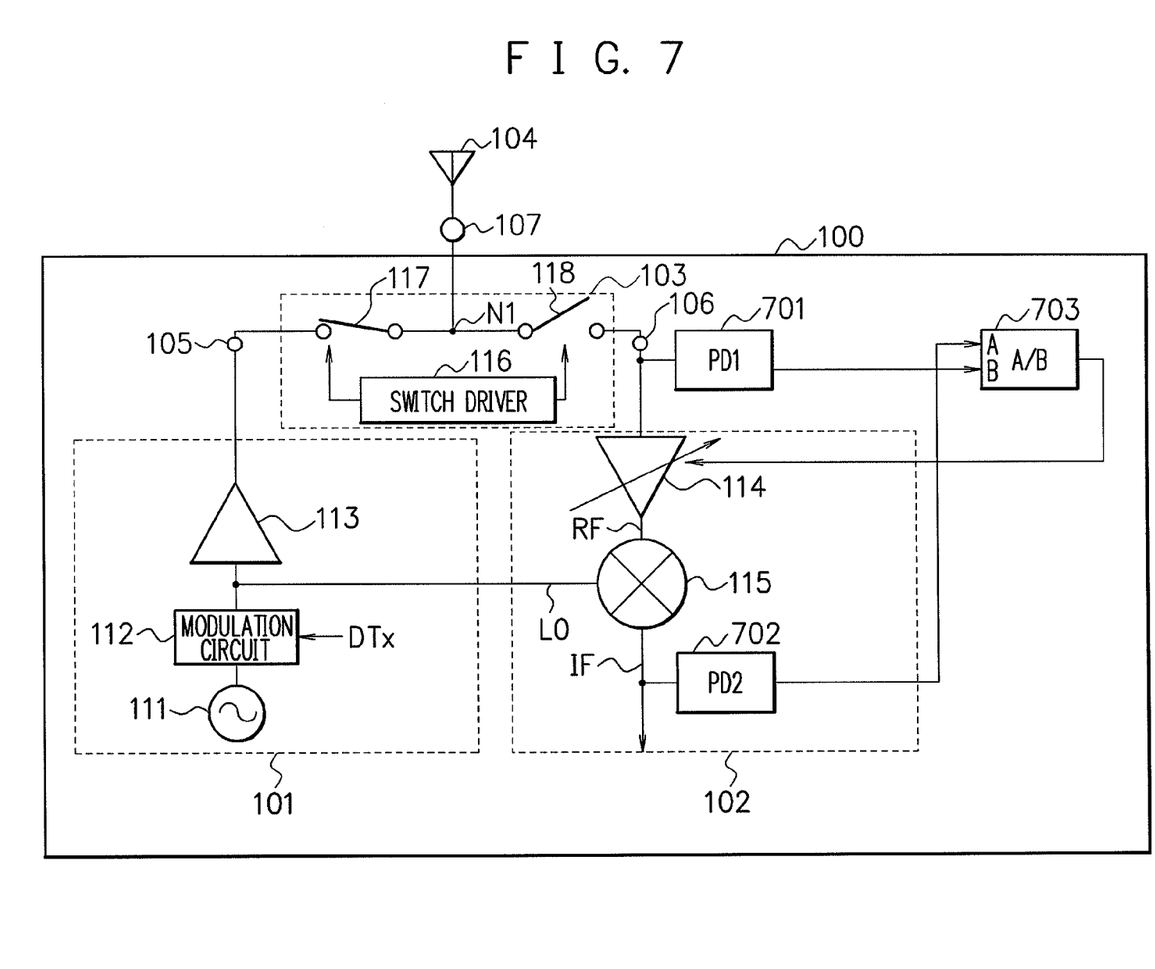
FIG. 7 is a circuit diagram depicting a configuration example of a communication device according to a seventh embodiment.

FIG. 7 is a circuit diagram depicting a configuration example of a communication device according to a seventh embodiment. This embodiment (FIG. 7) is such that power detection units 701 and 702 and a control unit 703 are added to the first embodiment (FIG. 1). Hereinafter, points where this embodiment differs from the first embodiment are explained. The first power detection unit 701 has a first detector for rectifying a signal at a third frequency (RF frequency) f3 and detects power B of an input signal to a low-noise amplifier 114. The second power detection unit 702 has a second detector for rectifying a signal at a second frequency (intermediate frequency) f2 and detects power A of an output signal from a frequency mixer 115. The low-noise amplifier 114 is a variable gain amplifier. The control unit 703 controls a gain of the low-noise amplifier 114 in accordance with a ratio A/B of the power A of the output signal from the frequency mixer 115 to the power B of the input signal to the low-noise amplifier 114.

In the inspection mode, gain performance is measured in order to select whether performance of an integrated circuit 100 satisfies its specification in a factory. Besides at the time of shipment, the gain performance is measured periodically (for example, every 30 minutes) to grasp a temperature fluctuation of a reception unit 102 and a gain performance fluctuation by a time-dependent change. In the case when the gain performance deteriorates, for example, a result thereof is fed-back on hardware or software to compensate the gain of the low-noise amplifier 114. The control unit 703 increases the gain of the low-noise amplifier 114 when the ratio A/B of the powers is smaller than a reference value. The control unit 703 reduces the gain of the low-noise amplifier 114 when the ratio A/B of the powers is larger than the reference value. This makes it possible to prevent the temperature fluctuation or the gain fluctuation by a time-dependent change and to maintain a gain of the reception unit 102 in a fixed value.

As described above, the communication devices in the first to seventh embodiments can evaluate the performance of the reception unit 102 by a simple method. Items to be evaluated are the gains of the low-noise amplifier 114 and the frequency mixer 115. In the case when a high frequency signal is externally input to the reception unit terminal 106 and power of the intermediate frequency signal IF is measured tentatively, an external high frequency signal source is needed, and thereby an inspection cost is increased. In the first to seventh embodiments, the signal LO to be generated in the transmission unit 101 is input to the reception unit 102, and the signal LO is modulated by turning the second switch 118 on/off and modulation signals are input to the reception unit 102. An external high frequency signal source is not needed, thus enabling the gain performance to be measured by an inexpensive device for low frequency and enabling an inspection cost to be reduced.

The communication devices in the first to seventh embodiments can be used for, for example, a millimeter wave radar for collision avoidance, a broadband wireless LAN, or the like.

By measuring power of an input signal to an amplifier and power of an output signal from a mixer, a gain of a reception unit can be evaluated. Since a signal from a transmission unit is used, without using an external high frequency signal source, performance of the reception unit can be inspected inexpensively and an inspection cost can be reduced.

Note that the above-described embodiments merely illustrate concrete examples of implementing the present embodiments, and the technical scope of the present embodiments is not to be construed in a restrictive manner by these embodiments. That is, the present embodiments may be implemented in various forms without departing from the technical spirit or main features thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A communication device comprising:
a first node connected to an antenna;
a transmission unit outputting a signal to the antenna via the first node;
a reception unit having a signal input thereto from the antenna via the first node;
a first switch provided between the first node and the transmission unit; and
a second switch provided between the first node and the reception unit, wherein
the second switch is alternately turned on and off repeatedly,
the reception unit comprises an amplifier amplifying a signal that the transmission unit outputs via the first and second switches and a mixer mixing a signal amplified in the amplifier and a local signal,
the mixer has a leakage signal of the first switch when the first switch is off input thereto, and wherein
the first switch comprises:
a plurality of inductors connected in series between the first node and the transmission unit;
a first n-channel field-effect transistor having a drain thereof connected to an Interconnection point of the plural first Inductors, having a source thereof connected to a reference potential node, and having a voltage higher than a threshold voltage applied to a gate thereof, and
the second switch comprises:
a plurality of second inductors connected in series between the first node and the reception unit; and
a second n-channel field-effect transistor having a drain thereof connected to an interconnection point of the plural second inductors, having a source thereof connected to a reference potential node, and having a voltage higher than a threshold voltage and a voltage lower than the threshold voltage alternately applied to a gate thereof.

2. The communication device according to claim 1, wherein
the first switch comprises a third n-channel field-effect transistor having a source and a drain thereof connected in series between the plural first inductors,
a voltage higher than a threshold voltage is applied to a gate of the third n-channel field-effect transistor,
the second switch comprises a fourth n-channel field-effect transistor having a source and a drain thereof connected in series between the plural second inductors, and
a voltage higher than a threshold voltage and a voltage lower than the threshold voltage are alternately applied to a gate of the fourth n-channel field-effect transistor.

3. The communication device according to claim 1, wherein
the first and second n-channel field-effect transistors are plurally provided respectively, and
a voltage higher than a threshold voltage or a voltage in which a voltage higher than the threshold voltage and a voltage lower than the threshold voltage are alternately repeated is selectively applied to the gate of one of the first n-channel field-effect transistors or the second n-channel field-effect transistors.

4. The communication device according to claim 1, further comprising:
a fifth n-channel field-effect transistor having a drain and a source thereof connected between the first node and a reference potential node, and wherein
in a transmission mode and a reception mode, a voltage lower than a threshold voltage is applied to a gate of the fifth n-channel field-effect transistor, and in an inspection mode, a voltage higher than the threshold voltage is applied to the gate of the fifth n-channel field-effect transistor.

5. A communication device comprising:
a first node connected to an antenna;
a transmission unit outputting a signal to the antenna via the first node;
a reception unit having a signal input thereto from the antenna via the first node;
a first switch provided between the first node and the transmission unit; and
a second switch provided between the first node and the reception unit, wherein
the second switch is alternately turned on and off repeatedly,
the reception unit comprises an amplifier amplifying a signal that the transmission unit outputs via the first and second switches and a mixer mixing a signal amplified in the amplifier and a local signal,
the mixer has a leakage signal of the first switch when the first switch is off input thereto, and wherein
the first switch comprises:
a plurality of first inductors connected in series between the first node and the transmission unit; and
a first n-channel field-effect transistor having a source and a drain thereof connected in series between the plural first inductors, and
a voltage higher than a threshold voltage is applied to a gate of the first n-channel field-effect transistor, and
the second switch comprises:
a plurality of second inductors connected in series between the first node and the reception unit; and
a second n-channel field-effect transistor having a source and a drain thereof connected in series between the plural second inductors, and
a voltage higher than a threshold voltage and a voltage lower than the threshold voltage are alternately applied to a gate of the second n-channel field-effect transistor.

* * * * *